United States Patent [19]
Dutt et al.

[11] Patent Number: 5,386,929
[45] Date of Patent: Feb. 7, 1995

[54] PORTION DISPENSING CAPS

[75] Inventors: Herbert V. Dutt, Sarasota, Fla.; Gary L. Mengeu, Wheeling, W. Va.; Frederick P. Minkemeyer, Tiltonsville, Ohio; Rodney O. Skaggs, McMechen, W. Va.; Douglas R. Ziegler, Cambridge, Ohio

[73] Assignee: Continental Plastics, Inc., Triadelphia, W. Va.

[21] Appl. No.: 137,423

[22] Filed: Oct. 18, 1993

[51] Int. Cl.6 ............................................. B67D 5/33
[52] U.S. Cl. ................................. 222/153; 222/336; 222/361
[58] Field of Search ............... 222/153, 349, 351, 355, 222/361, 366, 561, 336; 221/271, 264, 233; 425/577, DIG. 58

[56] References Cited

U.S. PATENT DOCUMENTS

| | | | |
|---|---|---|---|
| 2,358,913 | 9/1944 | Dobkin | 222/161 |
| 2,553,509 | 5/1951 | Altorfer, Jr. | 222/361 |
| 2,710,118 | 6/1955 | Stoddard | 222/361 |
| 3,118,577 | 1/1964 | Estabrook | 222/561 |
| 3,191,803 | 6/1965 | Hamilton | 221/264 |
| 3,217,945 | 11/1965 | Monaco | 222/305 |
| 3,347,425 | 10/1967 | Beushausen et al. | 222/438 |
| 4,102,477 | 7/1978 | Yoon | 222/361 |
| 4,403,715 | 9/1983 | Ludovissie | 222/361 |
| 4,408,703 | 10/1983 | Libit | 222/284 |
| 4,557,404 | 12/1985 | Solomon | 222/325 |
| 4,836,424 | 6/1989 | Afshar | 222/279 |
| 5,248,067 | 9/1993 | Garcia | 222/561 |
| 5,259,531 | 11/1993 | Bennett | 222/361 |

*Primary Examiner*—Andres Kashnikow
*Assistant Examiner*—Philippe Derakshani
*Attorney, Agent, or Firm*—Richard V. Westerhoff; David V. Radack

[57] ABSTRACT

Improvements in portion dispensing caps in which pre-measured portions of materials, such as particulate matter, can be dispensed from a container. The portion dispensing caps include a closure and a sliding member. The sliding member is biased in a loading position by a resilient arcuate projection. The sliding member can also include a portion which engages into and seals an opening in the closure. The sliding member may have a hingedly connected wall which is unattached when molded by an injection molding process but which is attached to other walls of the sliding member when the sliding member is disposed in the closure.

18 Claims, 4 Drawing Sheets

PORTION DISPENSING CAPS

BACKGROUND OF THE INVENTION

This invention relates to improvements in portion dispensing caps.

Portion dispensing devices are known in the art. These devices can include a sliding member that has a portion control chamber which receives a measured amount of material to be dispensed, most commonly food stuffs such as sugar, spices or coffee in powder or granulated form. The sliding member, when in a relaxed or non-engaged position, allows product loading in a pre-measured amount. When the sliding member is moved to an engaged position, the portion control chamber is aligned with holes where the contents of the portion control chamber can escape from the container. Thus, only the amount of material in the portion control chamber is dispensed from the container at any one time. In this way, a measured amount of material, for example a teaspoon of sugar or a tablespoon of coffee (depending on the dimension of the portion control chamber) is dispensed from the container.

Examples of sliding chamber portion dispensing devices are shown in U.S. Pat. Nos. 3,347,425; 4,403,715; and 4,836,424.

There is currently in commercial use a dispensing container having a sliding member operatively associated with a container that dispenses tablets of a sugar substitute sold under the trade designation "EQUAL". The sliding member includes a resilient plastic biasing member. When it is desired to dispense a single tablet from the container, the sliding member is moved and the resilient biasing member is biased against the inner surface of the container and the tablet falls into a tablet control chamber. The spring action of the biasing member returns the sliding member to the relaxed position once pressure is released from the sliding member. The tablet then falls through a second opening to be dispensed from the container.

Despite the known prior art devices there remains a need for an improved portion dispensing device, and more particularly for a portion dispensing cap that has improved biasing means so that the dispensing process can be carried out easily and effectively. There also remains a need for a portion dispensing cap that includes a closure and a sliding member which effectively seals the dispensing opening so that dirt and other impurities do not enter the closure. Finally, there is a need for a portion dispensing cap having a sliding member that is efficiently and economically made from a thermoplastic material by an injection molding process.

SUMMARY OF THE INVENTION

The several embodiments of improved portion dispensing caps made in accordance with the inventions disclosed herein meet the above-captioned needs. A first embodiment of the portion dispensing cap made in accordance with the invention comprises a closure and a sliding member, the sliding member defining a portion control chamber. The sliding member includes at least one resilient arcuate projection, the arcuate projection having a radius of curvature greater than the radius of curvature of the axial skirt of the closure. In this way, the projection slides along and is resiliently deflected by the inner surface of the closure annular skirt when the sliding member is moved.

Another embodiment of the portion dispensing cap of the invention also comprises a closure and a sliding member. The sliding member of this embodiment includes sealing means extending from the body portion of the sliding member. The sealing means has an engaging portion which at least partially engages into the dispensing opening in the closure to prevent dirt and other impurities from entering into the closure.

The final embodiment of a portion dispensing cap made in accordance with the invention comprises a closure and a sliding member, the sliding member defining a portion control chamber and an enclosed space. One of the walls defining the enclosed space is hingedly connected to another wall making up the enclosed space. The hingedly connected wall has a free end which is unattached to the other walls. The free end is attached to the other walls to form the enclosed space.

BRIEF DESCRIPTION OF THE DRAWINGS

A full understanding of the invention can be gained from the following description of the preferred embodiments when read in conjunction with the accompanying drawings in which.

DETAILED DESCRIPTION

Figure 1:
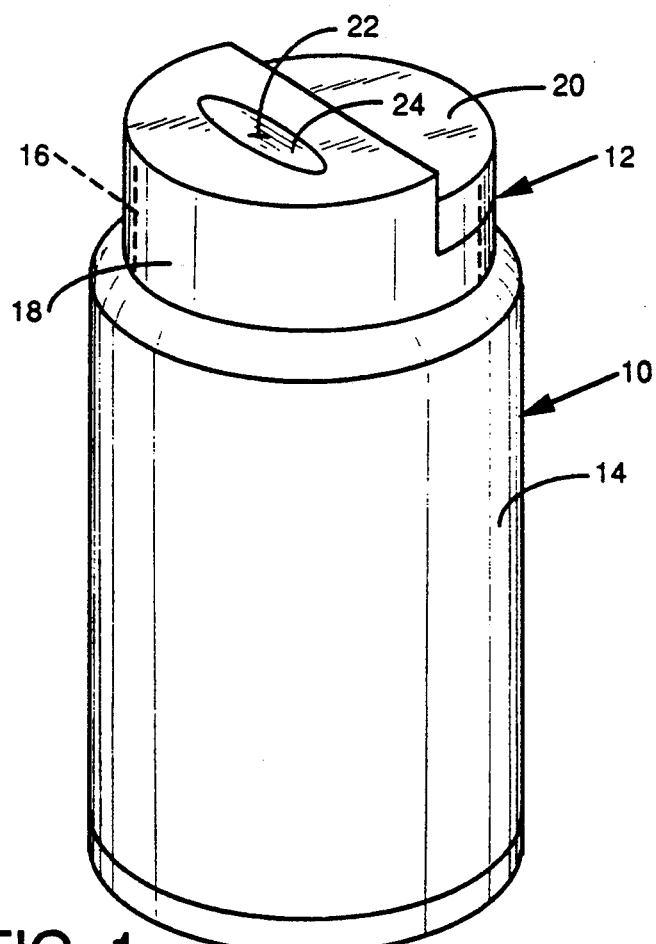
FIG. 1 is a perspective view of a container including a portion dispensing cap made in accordance with the invention.

Referring now to FIG. 1, a container 10 including a portion dispensing cap 12 made in accordance with the invention is shown. The container 10 and the portion dispensing cap 12 are preferably made of molded thermoplastic materials and are used to store and dispense materials. As used herein, the term "materials" includes granulated materials, such as granulated sugar, drink mixes and spices; powdered materials such as flour, baking powder, powdered sugar and powder drink mixes as well as body powders such as baby powder; individual tablet or pellets of materials such as tablets of sugar or sugar substitutes; and liquids.

The container 10 includes a body 14 that holds the materials and a cylindrical neck 16 which receives the portion dispensing cap 12. The portion dispensing cap 12 includes a closure 18 and a sliding member 20 which, as will be explained in detail below, is moved in and out of the closure 18 in order to dispense materials from the container 10. As can also be seen in FIG. 1, the closure 18 includes a dispensing opening 22, which is sealed by an engaging portion 24 of the sliding member 20.

Figure 2:
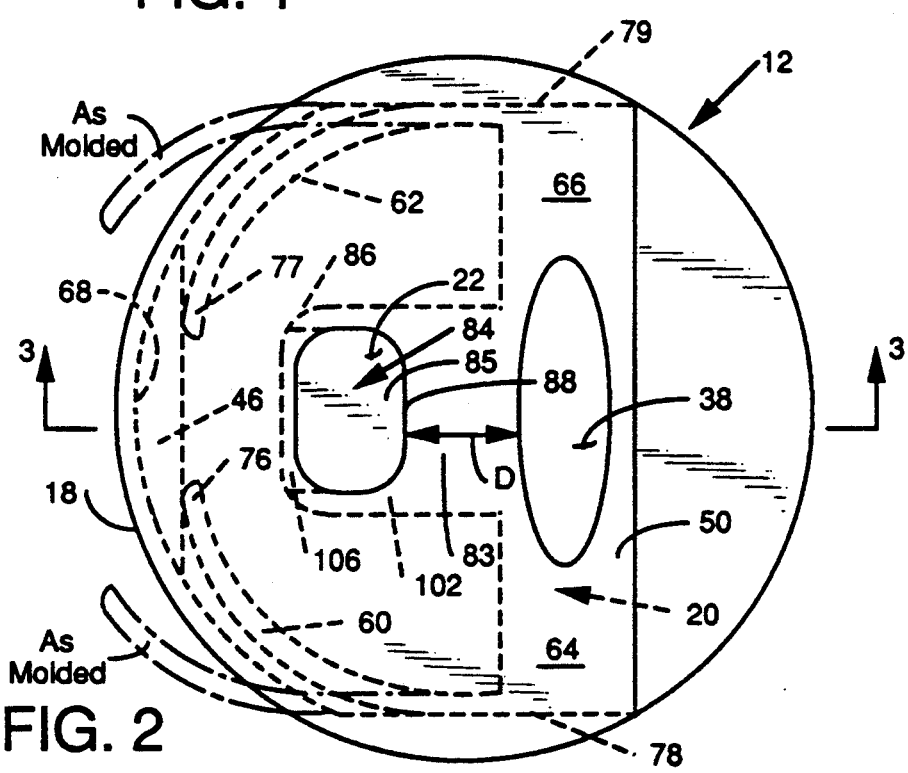
FIG. 2 s a top plan view, partially cutaway, of the portion dispensing cap.
Figure 3:
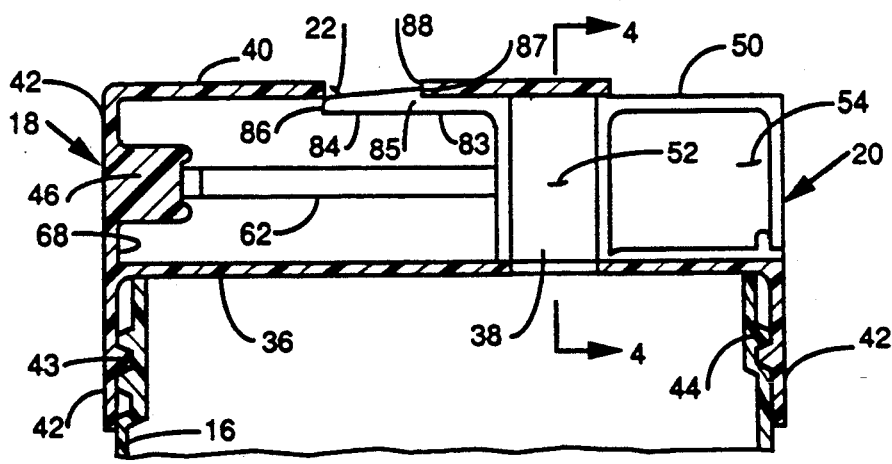
FIG. 3 is a cross-sectional view taken along line 3—3 of FIG. 2.
Figure 4:
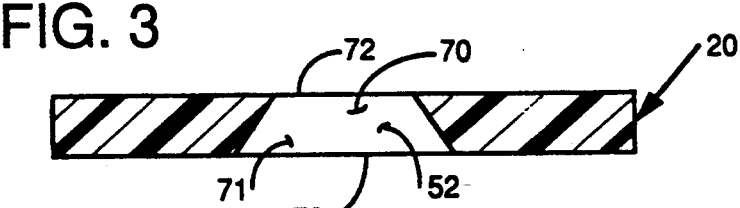
FIG. 4 is a cross-sectional view taken along line 4—4 of FIG. 3.

Referring now to FIGS. 2–4, the portion dispensing cap 12 will be described in greater detail. As can be seen in FIG. 3, the cap 12 includes the closure 18 and the sliding member 20. The closure 18 consists of an inner endwall 36 which defines a loading opening 38; an outer endwall 40 which defines the dispensing opening 22 shown also in FIG. 1 and an annular skirt 42. The annular skirt 42 includes a thread 43 which engages a complementary thread 44 on the cylindrical neck 16 of the container 10. As can best be seen in FIGS. 1 and 3, the outer endwall 40 and the skirt 42 are partially cutaway so that access may be gained to the sliding member 20. The closure also includes a radially inwardly projecting wall portion 46. The wall portion 46 forms a chord with the annular skirt 42. The purpose of this wall portion 46 will be disclosed further hereinbelow.

As can be seen in FIG. 2, the loading opening 38 is laterally staggered from the dispensing opening 22 in order to effect proper operation of the portion dispensing cap as will be discussed in FIGS. 7 and 8. The distance D (FIG. 2) between the loading opening 38 and the dispensing opening 22 should be great enough to resist product seepage while the sliding member 20 travels from a loading position to a dispensing position, as will be discussed below. The loading opening 38 is also shown as being bigger than and a different shape from the dispensing opening 22, although it will be appreciated that different sizes and shapes can be used depending on the amount and type of material it is desired to be dispensed. Furthermore, as is known to those skilled in the art, the dispensing opening 22 can be formed as sifter holes or longitudinal slots for dispensing material in a dispensed pattern. Sifter holes, for example, can be used for salting a hamburger where a predetermined amount of salt is desired to be dispensed on each hamburger.

The sliding member 20, which is preferably made of a thermoplastic material by an injection molding process, is disposed between the outer endwall 40 and the inner endwall 36. The sliding member 20 includes a sliding member body portion 50 which defines a portion control chamber 52 and an enclosed space 54 (FIG. 3). The sliding member further consists of a pair of projections 60 and 62 which extend, respectively, from side portions 64 and 66 of the sliding member body portion 50. FIG. 2 shows the projections 60 and 62 in the shape in which they are molded by an injection molding process (labelled "as molded"). As can be seen, the "as molded" projections 60 and 62 are slightly arcuate in shape, having a radius of curvature greater than the radius of curvature of the inner surface 68 annular skirt 42. When the sliding member 20 is placed in the closure 18 as is shown in FIG. 2, the radial projections 60 and 62, due to their resiliency, slide along and are resiliently deflectable by the inner surface 68 of the annular skirt 42.

It will be appreciated that the projections 60 and 62 permit the sliding member 20 to be moved radially between the outer endwall 40 and the inner endwall 36. The projections also bias the sliding member 20 in the "loading" position shown in FIGS. 2 and 3. In the loading position, the portion control chamber 52 is generally aligned with the loading opening 38 in the inner endwall 36 as can best be seen in FIG. 3. It will be appreciated that while in the loading position, material from the container 10 can flow through the loading opening 38 and into the portion control chamber 52. This process will be discussed further below with reference to FIGS. 7 and 8.

FIG. 4 shows a vertical section of the portion control chamber 52. The portion control chamber 52 has a upper section 70 and a lower section 71. The upper section 70 has a smaller opening 72 than the opening 73 of the lower section 71 and preferably the portion control chamber 52 tapers from the lower section 71 to the upper section 70. The opening 72 of the upper section 70 is substantially the same shape as the dispensing opening 22 and the opening 73 of the lower section is substantially the same shape as the loading opening 38. This will facilitate efficient loading and dispensing of the portion control chamber 52.

Referring back again to FIG. 2, the projections 60 and 62, while disposed in the loading position, have an average radii of curvature which is greater than the radius of curvature of the inner surface 68 annular skirt 42. It will be appreciated that at local points on the projections 60 and 62, such as end points 76 and 77, respectively, that the local radius of curvature may be less than the radius of curvature of the annular skirt. However, at most points along the projection, such as at the base portions 78 and 79 of projections 60 and 62, respectively, the local radius of curvature is greater than the radius of curvature of the annular skirt 42.

The projections 60 and 62 as shown in FIGS. 2 and 3 are preferably disposed in a plane that is generally parallel to both the inner endwall 36 and the outer endwall 38. The projections 60 and 62 can be dimensioned so that when the sliding member 20 is moved, the ends of the projections 60 and 62 can be turned radially inwardly by contact with wall 46 and furthermore can abut against each other to prevent further movement of the sliding member 20 in the closure 18. It will also be appreciated that the ends of the projections 60 and 62 can also curl radially inwardly when they meet. Finally, the wall 46 can be shaped and positioned in different ways so as to be engaged by the projections 60 and 62 to prevent further radial movement of the sliding member 20. It is in these ways that the projections 60 and 62 can control the extent of the movement of the sliding member 20 in the closure 18.

Figure 5:
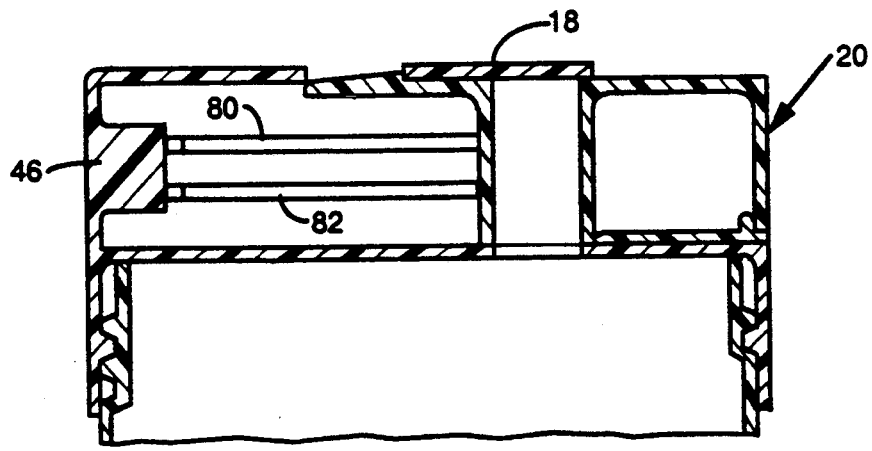
FIG. 5 is a vertical section of another embodiment of the sliding member showing the projections axially staggered.

Referring to FIG. 5, another embodiment of the sliding member is shown in which the projections 80 and 82 are disposed in axially offset planes. The projections 80 and 82 will not interfere with each other when the sliding member 20 is moved radially inwardly in the closure 18.

Figure 6:
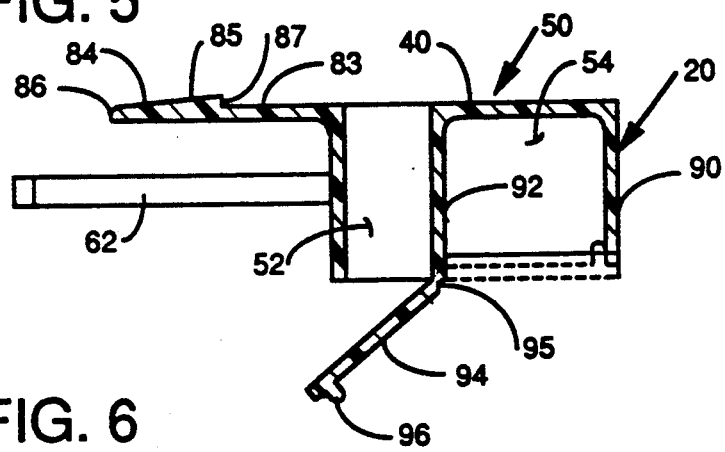
FIG. 6 is a vertical section showing the sliding member only.

Another aspect of the invention is shown in FIGS. 2 and 6. Extending from the sliding member body portion 50 is a sealing means which consists of a base portion 83 and an engaging portion 84. The engaging portion 84 is at least partially engaged into the dispensing opening 22 as is shown in FIG. 2. The engaging portion 84 has a junction portion 85 and a free end portion 86. The thickness of the engaging portion 84 tapers from the junction portion 85 to the free end portion 86. The junction portion 85 further includes a lip 87 which engages against an edge 88 of the dispensing opening 22. The engagement of the lip 87 with edge 88 not only keeps the sliding member 20 from becoming disengaged from the closure 18, but also acts to align the portion control chamber 52 with the loading opening 38 in the inner endwall 36 while the sliding member 20 is in the loading position as is shown in FIG. 2.

The engaging portion 84 seals the dispensing opening 22 while the sliding member 20 is in the loading position. This is because the engaging portion 84 extends partially into the dispensing opening 22 and because the free end portion 86 extends beyond the dispensing opening 22. Referring to FIG. 2, it can be seen that the engaging portion 84 entirely covers the dispensing opening 22 when the sliding member 20 is in the loading position. This prevents dirt and other impurities from entering into the closure 18 while the sliding member 20 is in the loading position.

Referring now to FIG. 6, yet another aspect of the invention is shown. FIG. 6 shows a vertical section of the sliding member 20 in the form that it emerges from the injection molding process. It will be appreciated that the enclosed space 54 of the sliding member is formed by a portion of the outer endwall 40, an outer annular wall 90, an inner sidewall 92 and a lower wall 94. The lower wall 94 is shown in its "as molded" position. The lower wall 94 is hingedly connected to the inner sidewall 92 by means of a living hinge 95 and includes a lip 96 disposed on the free end thereof. After injection molding of the sliding member by using a straight draw mold, without the need or use for slides, the hingedly connected lower wall 94 is moved from the open position shown in solid line in FIG. 6 to the closed position shown in phantom lines in FIG. 6 where the lip 96 securely engages the outer annular wall 90 to form the enclosed space 54. At this point the sliding member 20 can be placed into the closure 18 to form the portion dispensing cap 12 shown in FIGS. 2 and 3.

Figure 6A:
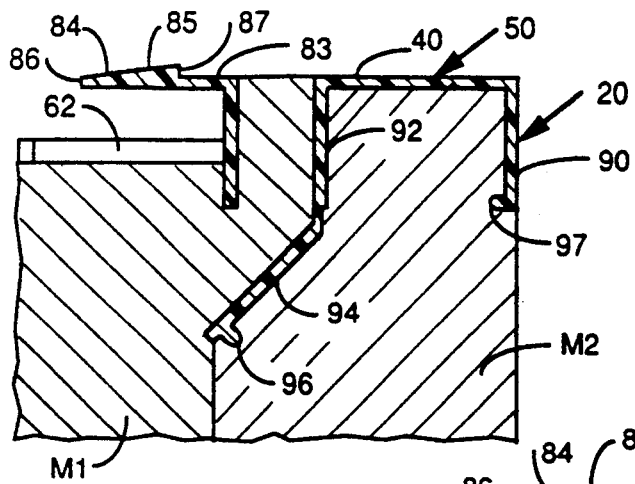
FIG. 6A is a vertical section showing the sliding member in the "molding sequence" in an injection molding machine.
Figure 6B:
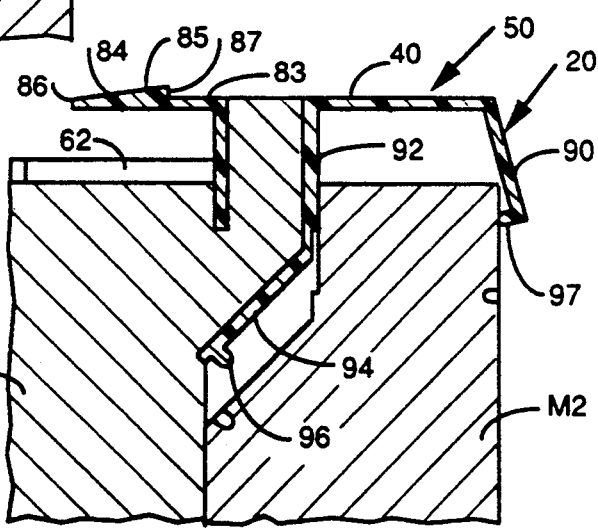
FIG. 6B is a vertical section showing the sliding member of FIG. 6A in the "lifter sequence".
Figure 6C:
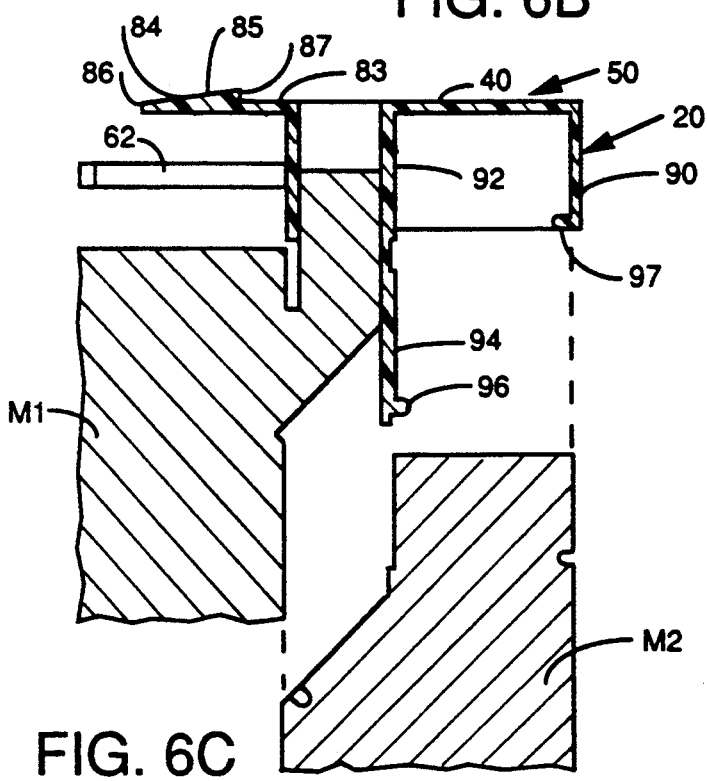
FIG. 6C is a vertical section showing the sliding member of FIG. 6A further in the "lifter sequence".

FIGS. 6A, 6B and 6C show how the sliding member 20 is injection molded in a straight draw injection molding machine. FIG. 6A shows a conventional straight draw mold having two mold parts M1 and M2. The mold parts, as is known, are made of steel, and define a cavity in which the sliding member 20 is molded. FIG. 6A shows the thermoplastic material after it is injected into the mold cavity to form the sliding member 20. This is the so-called "molding sequence". This sliding member 20 is also formed with a horizontal bead 97 extending from outer annular wall 90. This bead 97 facilitates snap fitting of the lip 96 of lower wall 94 to outer annular wall 90.

Referring now to FIG. 6B, after the molding sequence, the "lifter sequence" is commenced by moving M2 downward in the direction of the arrow. Because of the undercut created by the horizontal bead 97, it will be appreciated that the annular wall 90 bends outwardly as shown in FIG. 6B.

The lifter sequence continues as shown in FIG. 6C. Mold M2 is fully withdrawn and mold M1 is moved in the direction of the arrow. The mold M1 bears against lower wall 94 causing it to rotate about the hinge 95 as is shown by the arrow labelled "Rotation" in FIG. 6C. Because of the resiliency of the lower wall 94 and the shape of the living hinge 95, mold M1 can slide past lower wall 94 without causing the lower wall 94 to tear from the wall 92. Furthermore, lower wall 94 can snap back into the position shown in FIG. 6 for subsequent joining to wall 90 to form the completed sliding member 20. It will be appreciated that in this way, the sliding member 20 can be made by the use of conventional straight draw molds.

Figure 7:
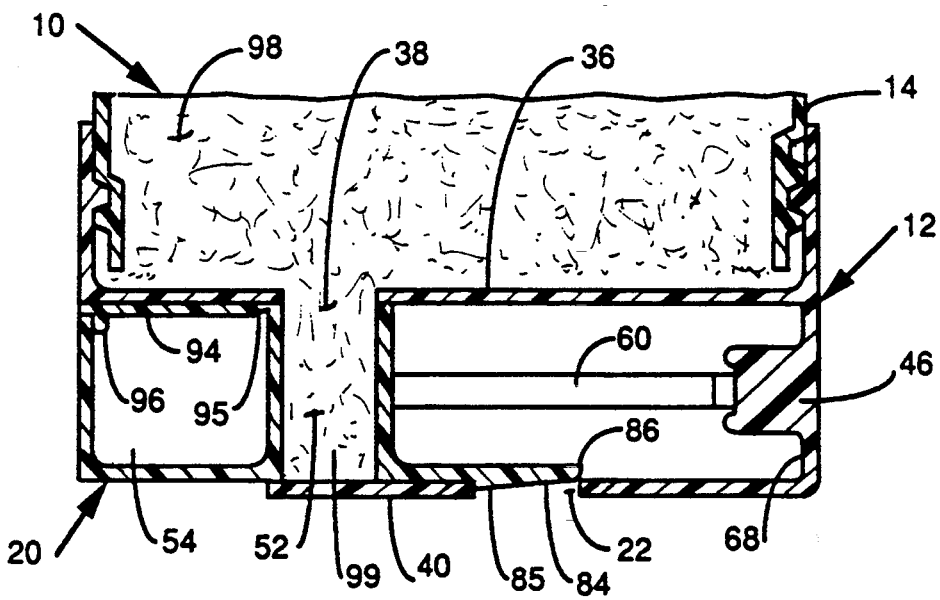
FIG. 7 is a vertical section showing the portion dispensing cap in the loading position.
Figure 8:
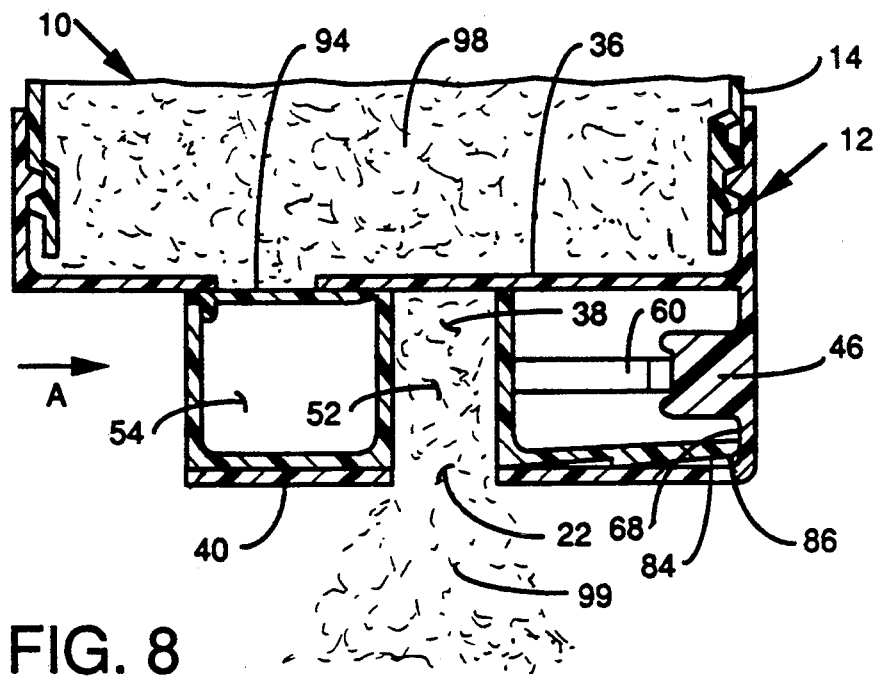
FIG. 8 is a vertical section showing the portion dispensing cap in the dispensing position.

Referring now to FIGS. 7 and 8, the operation and use of the portion dispensing cap 12 will be described. FIG. 7 shows the container in an inverted position (i.e., upside down from FIG. 1) with the portion dispensing cap 12 in the "loading position". In this position, the portion control chamber 52 is aligned with the loading opening 38 in the inner endwall 36 so, therefore, the material 98 in the container 10 flows from the container body 14 to eventually fill the portion control chamber 52. It will be appreciated that the portion control chamber 52 can be dimensioned to hold a predetermined amount of material 99, such as a teaspoon, tablespoon or one tablet, for example. While in the loading position, the material cannot be dispensed from the container because the outer endwall 40 encloses the portion control chamber 52 and the dispensing opening 22 is entirely covered by the engaging portion 84 of the sliding member 20.

Referring now to FIG. 8, when it is desired to dispense the material 99 in the portion control chamber 52, the sliding member 20 is pushed inwardly between the outer endwall 40 and inner endwalls 36 in the direction of arrow A. FIG. 8 shows the sliding member in the "dispensing position". The sliding member 20 is pushed inwardly against the biasing force of the radial projections 60 and 62. When the portion control chamber 52 is aligned with the dispensing opening 22 the material 99 in the portion control chamber 52 is entirely dispensed through the dispensing opening 22.

The remaining material 98 in the container body 14 is prevented from entering into the closure 18 or being dispensed from the container 10 because the portion control chamber 52 is blocked by the inner endwall 36 and because the lower hingedly connected wall 94 entirely covers the loading opening 38. Furthermore, because the lower hingedly connected wall 94 forms the enclosed space 54, no material enters into the enclosed space 54.

It will be appreciated that the shape of the engaging portion 84 facilitates movement of the sliding member 20 from the loading position to the dispensing position. As discussed above, the engaging portion 84 tapers uniformly in thickness from the junction portion 85 to the free end portion 86. This forms a pilot surface which rides under the outer endwall 40 when the sliding member 20 is moved from the loading position to the dispensing position. Furthermore, the sealing means can be dimensioned to form a stop means as is shown in FIG. 8. That is, the free end portion 86 of the engaging portion 84 contacts the inner annular skirt wall surface 68 to prevent further movement of the sliding member 20. This acts to stop the sliding member 20 in its proper dispensing position, i.e., so that the portion control chamber 52 is aligned with the dispensing opening 22. Finally, it will be appreciated that the radial projections 60 and 62 which bear against the chord wall 46 and/or each other also act as stop means.

It will be appreciated that improvements in a portion dispensing cap in accordance with the invention have been disclosed. While specific embodiments of the invention have been disclosed, it will be appreciated by those skilled in the art that various modifications and alterations to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A portion dispensing cap comprising:
   a closure adapted to be secured to a container holding a material to be dispensed therefrom, said closure having (i) an inner endwall defining a first opening; (ii) an outer endwall axially spaced from said inner endwall and defining a second opening, said second opening being laterally offset from said first opening; and (iii) a skirt extending axially from at least a portion of said inner and outer endwalls, said skirt having a generally annular inner surface having a first radius of curvature; and a sliding member comprising:
a sliding member body portion defining a portion control chamber;
said slidable member being movable between said inner endwall and said outer endwall of said closure from a loading position wherein said portion control chamber is generally aligned with said first opening to a dispensing position wherein said portion control chamber is generally aligned with said second opening such that material to be dispensed from said container is able to fill said portion control chamber through said first opening when said sliding member is in said loading position and only said material contained in said portion control chamber can be dispensed from said portion control chamber through said second opening when said sliding member is in said dispensing position; and
at least one resilient arcuate projection extending from said sliding member body portion and biasing said sliding member in said loading position, said projection having a second radius of curvature, said second radius of curvature being greater than said first radius of curvature of said generally annular inner surface of said skirt such that said projection slides along and is resiliently deflected by said inner surface when said sliding member is moved;
said skirt has a wall forming a chord, said at least one resilient arcuate projection engaging said wall in order to control the movement of said sliding member.

2. The cap of claim 1, wherein
said sliding member has an intermediate portion and a pair of side portions; and
said projection extending from one of said side portions.

3. The cap of claim 2, wherein
said sliding member has a pair of projections; and
a first said projection extends from one of said side portions of said sliding member and a second said projection extends from the other of said side portions of said sliding member.

4. The cap of claim 3, wherein
said projections are parallel to at least one of said inner endwall and said outer endwall of said closure.

5. The cap of claim 4, wherein
said projections are disposed in substantially the same plane.

6. The cap of claim 4, wherein
said projections are disposed in axially offset planes.

7. A portion dispensing cap comprising:
a closure adapted to be secured to a container holding a material to be dispensed therefrom, said closure having (i) an inner endwall defining a first opening, (ii) an outer endwall axially spaced from said inner endwall and defining a second opening, said second opening being laterally offset from said first Opening; and (iii) a skirt extending axially from at least a portion of said inner and outer endwalls;

a sliding member comprising:
a sliding member body portion defining a portion control chamber;
said sliding member being movable between said inner endwall and said outer endwall of said closure from a loading position wherein said portion control chamber is generally aligned with said first opening to a dispensing position wherein said portion control chamber is generally aligned with said second opening such that material to be dispensed from said container is able to fill said portion control chamber through said first opening when said sliding member is in said loading position and only said material contained in said portion control chamber can be dispensed from said portion control chamber through said second opening when said sliding member is in said dispensing position;
sealing means extending from said sliding member body portion, said sealing means having an engaging portion at least partially engaging into said second opening when said sliding member is in said loading position;
biasing means for biasing said sliding member in said loading position;
said engaging portion is shaped to facilitate radial movement of said sealing means when said sliding member is moved from said loading position to said dispensing position and then back to said loading position;
said engaging portion has a free end portion and a junction portion opposite said free end portion; and
said engaging portion has a greater thickness at said junction portion than at said free end portion.

8. The cap of claim 7, wherein
said engaging portion tapers in thickness from said junction portion to said free end portion.

9. The cap of claim 7, wherein
said engaging portion entirely covers said second opening when said sliding member is in said loading portion so that impurities are resisted from entering into said closure.

10. The cap of claim 7, wherein
said engaging portion forms a stop means to prevent said sliding member from disengaging from said closure.

11. The cap of claim 7, wherein
said junction portion includes a lip which engages against an edge of said second opening to align said sliding member in said loading position.

12. The cap of claim 7, wherein
said engaging portion has an engaging surface which rides under said outer endwall when said sliding member is moved to said dispensing position.

13. The cap of claim 7, wherein
said free end portion forms a stop means for said sliding member when said sliding member is moved to said dispensing position.

14. A portion dispensing cap comprising:
a closure adapted to be secured to a container holding a material to be dispensed therefrom, said closure having (i) an inner endwall defining a first opening, (ii) an outer endwall axially spaced from said inner endwall and defining a second opening, said second opening being laterally offset from said first opening; and (iii) a skirt extending axially from at least a portion of said inner and outer endwalls; and a sliding member comprising:

a sliding member-body portion defining a portion control chamber and an enclosed space, said enclosed space being formed by a plurality of walls, at least one of said walls being hingedly connected to an adjacent said wall, said hingedly connected wall having a free end opposite said hingedly connected portion, said enclosed space being formed by moving said hingedly connected wall from an open position wherein said free end is unattached to any of said walls to a closed position wherein said free end engages an adjacent said wall to form said enclosed space;

said sliding member being movable between said inner endwall and said outer endwall of said closure from a loading position wherein said portion control chamber is generally aligned with said first opening to a dispensing position wherein said portion control chamber is generally aligned with said second opening such that material to be dispensed from said container is able to fill said portion control chamber through said first opening when said sliding member is in said loading position and only said material contained in said portion control chamber can be dispensed from said portion control chamber through said second opening when said sliding member is in said dispensing position; and biasing means for biasing said sliding member to said loading position.

15. The cap of claim 14, wherein
said free end of said hingedly connected wall has a lip extending generally perpendicularly therefrom, said lip adapted to engage said wall when said hingedly connected wall is in said closed position.

16. The cap of claim 14, wherein
said hingedly connected wall covers said first opening when said sliding member is in said dispensing position, whereby material from said container is resisted from entering into said enclosed space.

17. The cap of claim 14, wherein
said portion control chamber has an upper section adjacent to said second opening when said sliding member is in said dispensing position and a lower section adjacent to said first opening when said sliding member is in said loading position; and said upper section is generally the same shape as said first opening and said lower section is generally the same shape as said second opening.

18. The cap of claim 17, wherein
said first opening is larger than said second opening; and said portion control chamber tapers from said first opening to said second opening.

* * * * *